United States Patent
Kim et al.

(10) Patent No.: US 9,753,595 B2
(45) Date of Patent: Sep. 5, 2017

(54) TOUCH SCREEN PANEL

(71) Applicant: Samsung Display Co., Ltd., Yongin, Gyeonggi-Do (KR)

(72) Inventors: Jung Yun Kim, Yongin (KR); Sung Ku Kang, Yongin (KR)

(73) Assignee: Samsung Display Co., Ltd. (KR)

( * ) Notice: Subject to any disclaimer, the term of this patent is extended or adjusted under 35 U.S.C. 154(b) by 29 days.

(21) Appl. No.: 14/795,553

(22) Filed: Jul. 9, 2015

(65) Prior Publication Data

US 2016/0103520 A1     Apr. 14, 2016

(30) Foreign Application Priority Data

Oct. 13, 2014   (KR) .......................... 10-2014-0137619

(51) Int. Cl.
 *G06F 3/044*     (2006.01)
(52) U.S. Cl.
 CPC .... *G06F 3/044* (2013.01); *G06F 2203/04112* (2013.01)
(58) Field of Classification Search
 CPC ........................ G06F 3/044; G06F 2203/04112
 USPC ....................................................... 345/174
 See application file for complete search history.

(56) References Cited

U.S. PATENT DOCUMENTS

| | | | |
|---|---|---|---|
| 8,508,495 B2 | 8/2013 | Hotelling et al. | |
| 2008/0316182 A1 | 12/2008 | Antila et al. | |
| 2011/0102370 A1* | 5/2011 | Kono | G06F 3/044 345/174 |
| 2013/0278513 A1 | 10/2013 | Jang | |
| 2014/0069796 A1 | 3/2014 | Kang et al. | |
| 2015/0193034 A1* | 7/2015 | Jeong | G06F 3/044 345/173 |
| 2015/0363024 A1* | 12/2015 | Hayashi | G06F 3/044 345/174 |
| 2015/0370375 A1* | 12/2015 | Hayashi | G06F 3/044 345/174 |

FOREIGN PATENT DOCUMENTS

| | | |
|---|---|---|
| KR | 10-2013-0118072 | 10/2013 |
| KR | 10-2014-0033966 | 3/2014 |

* cited by examiner

*Primary Examiner* — Fred Tzeng
(74) *Attorney, Agent, or Firm* — Innovation Counsel LLP

(57) ABSTRACT

Provided is a touch screen panel. According to an exemplary embodiment, the touch screen panel includes first sensing electrodes arranged in a first direction and in first mesh patterns and second sensing electrodes arranged in a second direction crossing the first direction and in second mesh patterns, wherein, at a region where the first and second sensing electrodes overlap each other, a portion of at least one of the first and second mesh patterns is removed such that the first and second mesh patterns are free from overlap with each other at the location where the portion is removed.

11 Claims, 5 Drawing Sheets

TOUCH SCREEN PANEL

CROSS-REFERENCE TO RELATED APPLICATION

This application claims priority to and the benefit of Korean Patent Application No. 10-2014-0137619, filed on Oct. 13, 2014, in the Korean Intellectual Property Office, the entire content of which is incorporated herein by reference in its entirety.

BACKGROUND

1. Field

The present disclosure relates to a touch screen panel.

2. Description of the Related Art

Touch screen panels are input devices that allow users to input commands by touching instructions appearing on the screen of display devices, and the like, with the users' fingers or other tools. Such touch screen panels are capable of replacing input devices, such as keyboards, mouse devices, and the like, that are typically separate from but connected to display devices. As such, touch screen panels are widely used.

A touch screen panel may implement various methods of sensing user input, including a resistive film method, an optical detection method, a capacitive method, and the like. The touch screen panel implementing a capacitive method may include first sensing electrodes and second sensing electrodes arranged in a touch activation region. When a hand or an object comes in contact with a touch activation region of the touch screen panel, a change in capacitance between the first sensing electrodes and the second sensing electrodes may be detected, and a touch position may be converted into an electrical signal.

In some cases, the first and second sensing electrodes may be mesh patterns, and the first and second sensing electrodes provided in different layers may overlap each other. As a result, an overlap capacitance may occur due to overlapping of the mesh patterns between the first and second sensing electrodes.

SUMMARY

Embodiments may be realized by providing a touch screen panel, including first sensing electrodes arranged in a first direction and in first mesh patterns and second sensing electrodes arranged in a second direction crossing the first direction and in second mesh patterns, wherein, at a region where the first and second sensing electrodes overlap each other, a portion of at least one of the first and second mesh patterns is removed such that the first and second mesh patterns free from overlap with each other at the location where the portion is removed.

According to an embodiment, the first and second mesh patterns may have a structure in which a plurality of conductive lines cross each other, and, at least one conductive line of the first and second mesh patterns may be disconnected at a crossing region where a conductive line of the first mesh patterns and a conductive line of the second mesh patterns would otherwise cross if neither conductive line is disconnected.

According to an embodiment, the conductive line of the first mesh patterns and the conductive line of the second mesh patterns may be alternately disconnected in adjacent crossing regions where at least one conductive line is disconnected.

According to an embodiment, the conductive line may extend diagonally with respect to the first direction and the second direction cross each other.

According to an embodiment, the first and second sensing electrodes may be formed of a same material and on different layers.

According to an embodiment, the touch screen panel may further include an insulating layer disposed between the first sensing electrodes and the second sensing electrodes.

According to an embodiment, the first and second sensing electrodes may be formed of at least one material selected from a group consisting of molybdenum (Mo), silver (Ag), titanium (Ti), copper (Cu) and aluminum (Al).

According to an embodiment, the touch screen panel may further include a substrate, the substrate being divided into an active area and a non-active area bordering the active area, and the first and second sensing electrodes may be provided in the active area of the substrate.

According to an embodiment, the first sensing electrodes may be on a first surface of the substrate, and the second sensing electrodes may be on a second surface facing oppositely from the first surface.

According to an embodiment, the substrate may be a thin film substrate formed of at least one material selected from a group consisting of polyethylene terephthalate (PET), polycarbonate (PC), acryl, poly(methyl methacrylate) (PMMA), triacetyl cellulose (TAC), poly(ether sulfone) (PES), and polyimide (PI).

According to an embodiment, the touch screen panel may further include external wires configured to couple each of the first and second sensing electrodes to an external driving circuit.

BRIEF DESCRIPTION OF THE DRAWINGS

Example embodiments are described hereinafter with reference to the accompanying drawings. However, the present system and method may be embodied in different forms and are not limited to the embodiments set forth herein. Rather, these embodiments are provided as examples to facilitate the understanding of the present teachings by those of ordinary skill in the art.

In the drawings, the dimensions of the figures may be exaggerated for clarity of illustration. When an element is referred to as being "between" two elements, the element be the only element present between the two elements, or one or more intervening elements may also be present. Like reference numerals refer to like elements throughout.

DETAILED DESCRIPTION

Figure 1:
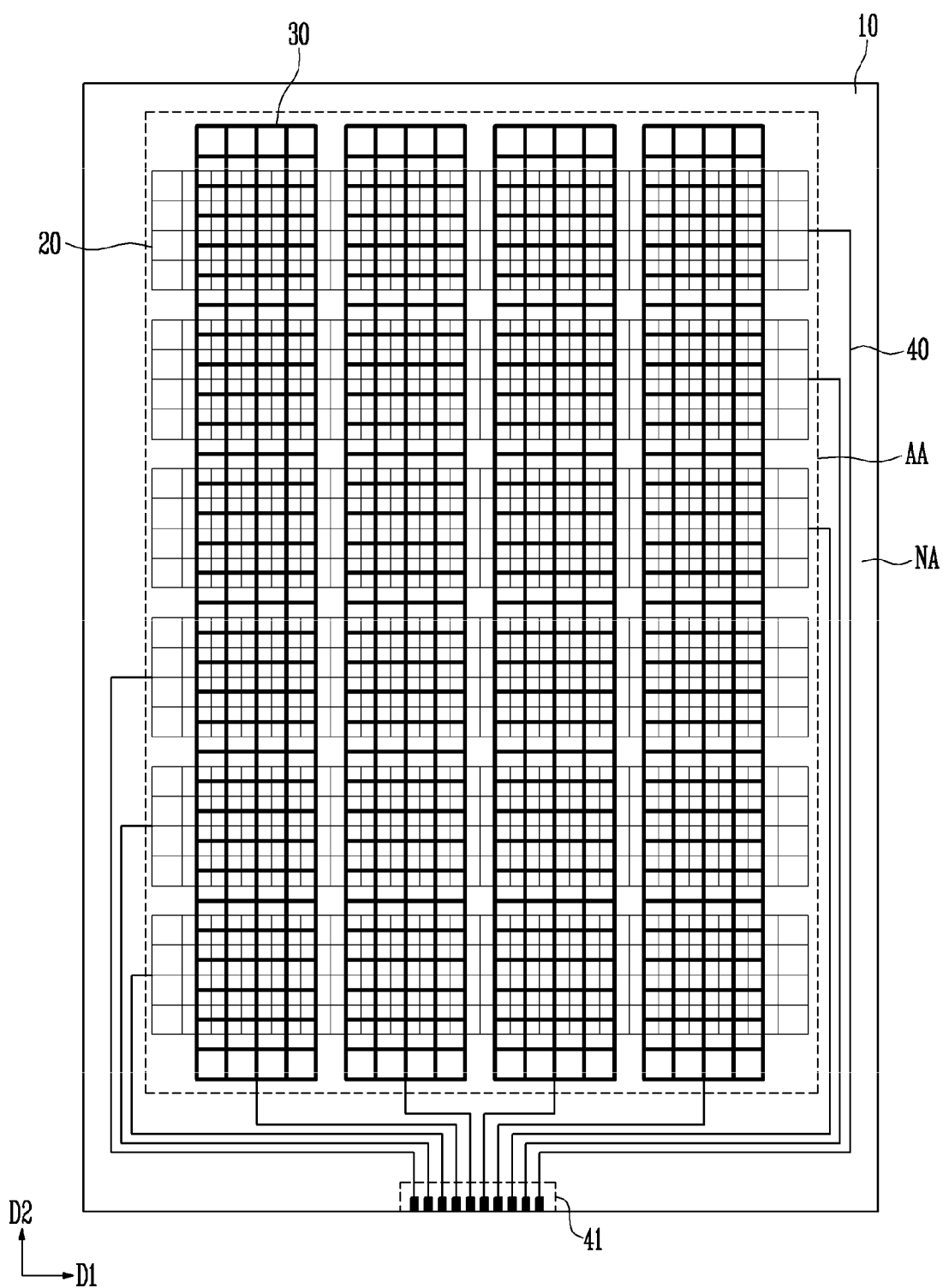
FIG. 1 is a plan view schematically illustrating a touch screen panel according to an embodiment.

Although only certain exemplary embodiments of the present system and method are shown and described herein for purposes of illustration, those of ordinary skill in the art would understand that the described embodiments may be modified in various different ways without departing from the spirit or scope of the present system and method. Accordingly, the drawings and description are illustrative in nature and not restrictive. In addition, when an element is referred to as being "on" other element, it may be directly on the other element, or it may be indirectly on the other element with one or more intervening elements interposed in between. Further, when a layer is referred to as being "under" another layer, it may be directly under, or one or more intervening layers may also be present. In addition, when a layer is referred to as being "between" two layers, it may be the only layer between the two layers, or one or more intervening layers may also be present. Also, when an element is referred to as being "connected to" another element, it may be directly connected to the other element, or it may be indirectly connected to the other element through one or more intervening elements. Hereinafter, like reference numerals refer to like elements. In the drawings, the thickness or size of layers may be exaggerated for clarity and not necessarily drawn to scale.

FIG. 1 is a plan view schematically illustrating a touch screen panel according to an embodiment. Referring to FIG. 1, the touch screen panel may include a substrate 10, first sensing electrodes 20, second sensing electrodes 30 and external wires 40.

The substrate 10 may be formed of a transparent material and may have high heat-resistant and chemical-resistant properties. In some embodiments, it may have flexible properties. For example, it may be a thin film substrate formed of one or more selected from the group consisting of polyethylene terephthalate (PET), polycarbonate (PC), acryl, poly(methyl methacrylate) (PMMA), triacetyl cellulose (TAC), poly(ether sulfone) (PES), and polyimide (PI).

The substrate 10 may be divided into an active area AA where a touch input may be detected, and a non-active area NA provided on the outskirts of and bordering the active area AA. When a display screen panel is integrated with and coupled to the touch screen panel, the active area AA of the touch screen panel may be visible to users through an overlapping image display area of the display screen panel (not shown). The non-active area NA, on the other hand, may not be visible to the users due to its overlap with a light blocking layer and/or a frame covering a non-display area of the display screen panel.

The first sensing electrodes 20 may be arranged to extend in a first direction D1 and disposed in the active area AA on the substrate 10. The second sensing electrodes 30 may be arranged to extend in a second direction D2 that crosses the first direction D1 and disposed in the active area AA on the substrate 10. Although the first and second sensing electrodes 20 and 30 may overlap one another at crossing regions, they may be electrically insulated from one another. The first and second sensing electrodes 20 and 30 may be formed of the same materials on different layers. For example, the first and second sensing electrodes 20 and 30 may be formed of a material including one or more selected from the group consisting of molybdenum (Mo), silver (Ag), titanium (Ti), copper (Cu) and aluminum (Al).

The first and second sensing electrodes 20 and 30 may be formed with metal mesh patterns in which a plurality of conductive lines crosses each other in various configurations. For example, the conductive lines may be formed to cross each other at right angles, or they may cross diagonally or bend and cross in a fan shape. The present system and method are not limited to these examples. Exemplary mesh patterns are described below with reference to FIGS. 3A to 3E.

The external wires 40 may couple each of the first and second sensing electrodes 20 and 30 to an external driving circuit, on a line-by-line basis, depending on the first direction D1 and the second direction D2. For example, the external wires 40 may electrically couple the external driving circuit, such as a position detecting circuit, to row lines and column lines via a pad unit 41.

The external wires 40 may be disposed in the non-active area NA on the outskirts of the touch screen panel and not in the active area AA. The external wires 40 may be formed of a variety of materials. For example, the external wires 40 may be formed of a low resistance metal material such as molybdenum (Mo), silver (Ag), titanium (Ti), copper (Cu), aluminum (Al), molybdenum/aluminum/molybdenum (Mo/Al/Mo), and the like, in addition to a transparent electrode material.

As described above, the touch screen panel may implement a capacitive method of sensing user input. With the capacitive method, a capacitive change according to a touch position may be transferred to a driving circuit. For example, when an object such as a human hand, a stylus pen, and the like contacts or touches the touch screen panel, a capacitive change according to the touch position may be transferred from the first and second sensing electrodes 20 and 30 to the driving circuit via the external wires 40 and the pad unit 41. The touch position may be determined as the capacitive change is converted into an electrical signal by an X- and Y-input processing circuit (not shown), and the like.

Figure 2A:
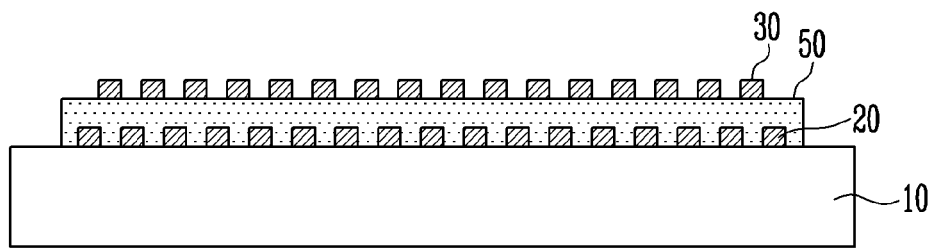
FIGS. 2A, 2B and 2C are cross sectional views of a touch screen panel according to an embodiment.
Figure 2B:
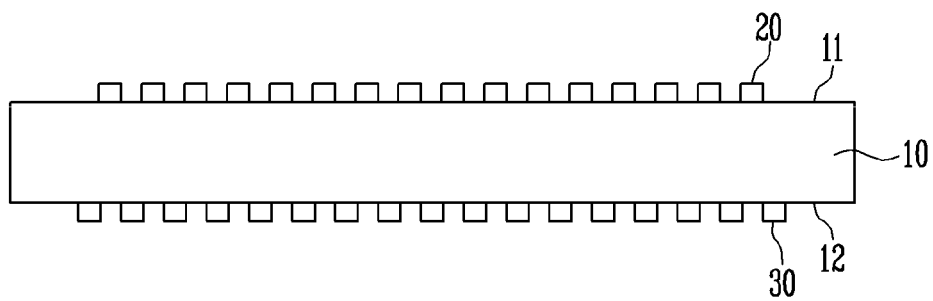
Figure 2C:
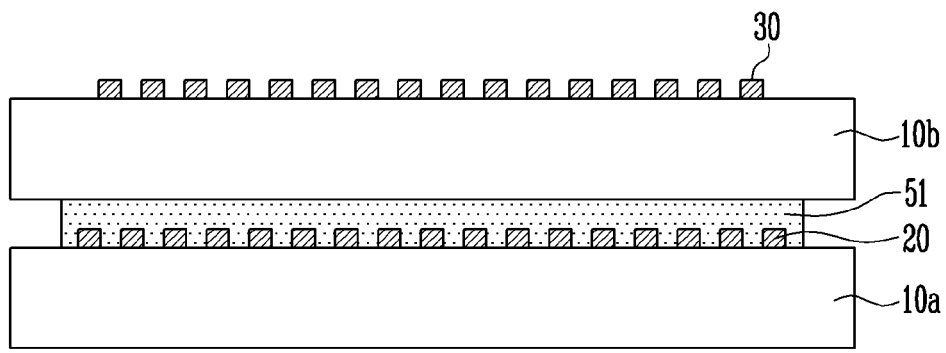

FIGS. 2A, 2B and 2C are cross sectional views of a touch screen panel according to various embodiments. Referring to the embodiment of FIG. 2A, the touch screen panel may further include an insulating layer 50 between the first sensing electrodes 20 and the second sensing electrodes 30. The insulating layer electrically insulates the first sensing electrodes 20 and the second sensing electrodes 30 from one another. The touch screen panel according to this embodiment may be manufactured by sequentially forming the first sensing electrodes 20, the insulating layer 50 and the second sensing electrodes 30 on the substrate 10.

Referring to another embodiment of FIG. 2B, the first sensing electrodes 20 are arranged on a first surface 11 of the substrate 10, and the second sensing electrodes 30 are arranged on a second surface 12 of the substrate 10. The first surface 11 and second surface 12 face opposite directions. The touch screen panel according to this embodiment may be manufactured by forming the first sensing electrodes 20 on one side of the substrate 10 and forming the second sensing electrodes 30 on the other side of the substrate 10. Compared to that of FIG. 2A, the embodiment of FIG. 2B does not require a separate insulating layer for insulating the first and second sensing electrodes 20 and 30.

Referring to the embodiment of FIG. 2C, the touch screen panel may have a structure in which the first sensing electrodes 20 are arranged on a first substrate 10a, and the second sensing electrodes 30 are arranged on a second substrate 10b. An adhesive layer 51 may be interposed between the first sensing electrodes 20 and the second substrate 10b. The touch screen panel according to this embodiment may be manufactured by adhering the two substrates 10a and 10b together using the adhesive layer 51, after forming the first and second sensing electrodes 20 and 30 on the two substrates 10a and 10b, respectively.

As described above, the first and second sensing electrodes 20 and 30 may be formed with metal mesh patterns in which a plurality of conductive lines crosses each other. The first sensing electrodes 20 may have first mesh patterns, and the second sensing electrodes 30 may have second mesh patterns. For convenience of description, in the following drawings, an area in which the first sensing electrodes 20 and the second sensing electrodes 30 overlap each other is enlarged, and only the first and second mesh patterns are illustrated. However, the touch screen panel may have a structure in which the first and second mesh patterns are arranged repeatedly in the active area AA.

FIGS. 3A, 3B, 3C, 3D and 3E are expanded views of a mesh pattern structure of a touch screen panel according to various embodiments. Referring to the embodiment of FIG. 3A, the touch screen panel may have a structure in which a portion of at least one of the first and second mesh patterns 21a and 31a is removed such that the first and second mesh patterns 21a and 31a are free from overlap with each other at the location where the portion is removed. That is, at least one conductive line of the first and second mesh patterns 21a and 31a may be disconnected at a crossing region where a conductive line of the first mesh patterns 21a and a conductive line of the second mesh patterns 31a would otherwise cross if neither conductive line is disconnected. The locations of the crossing regions where the conductive lines of the mesh pattern structure are disconnected may vary across embodiments.

Figure 3A:
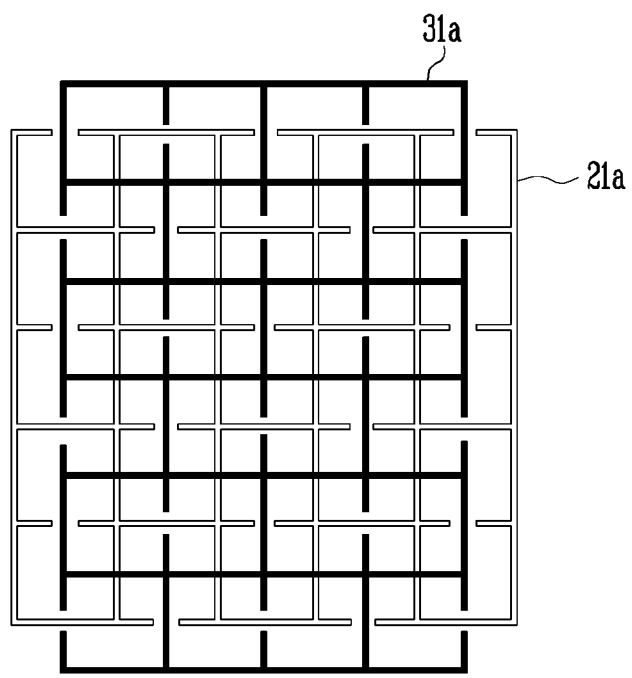
FIGS. 3A, 3B, 3C, 3D and 3E are expanded views of a mesh pattern structure of a touch screen panel according to various embodiments.

As FIG. 3A illustrates, crossing regions where at least one conductive line of first and second mesh patterns 21a and 31a is disconnected may be alternately disposed with crossing regions where neither conductive line of the first and second mesh patterns 21a and 31a is disconnected. That is, if the conductive line is disconnected at a first crossing region of the first and second mesh patterns 21a and 31a, the conductive line may be connected at a second crossing region adjacent to the first crossing region.

Also, the conductive line of the first mesh patterns 21a and the conductive line of the second mesh patterns 31a may be alternately disconnected in adjacent crossing regions where at least one conductive line is disconnected. An electrical signal may be transferred via a conductive line that is not disconnected. Accordingly, overlapping capacitance that is generated due to overlapping of the first and second sensing electrodes may be minimized.

Figure 3B:
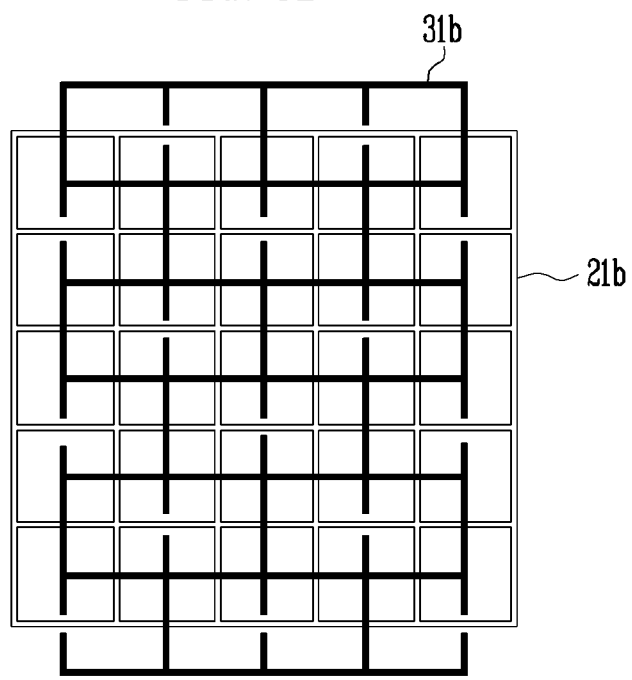
Figure 3C:
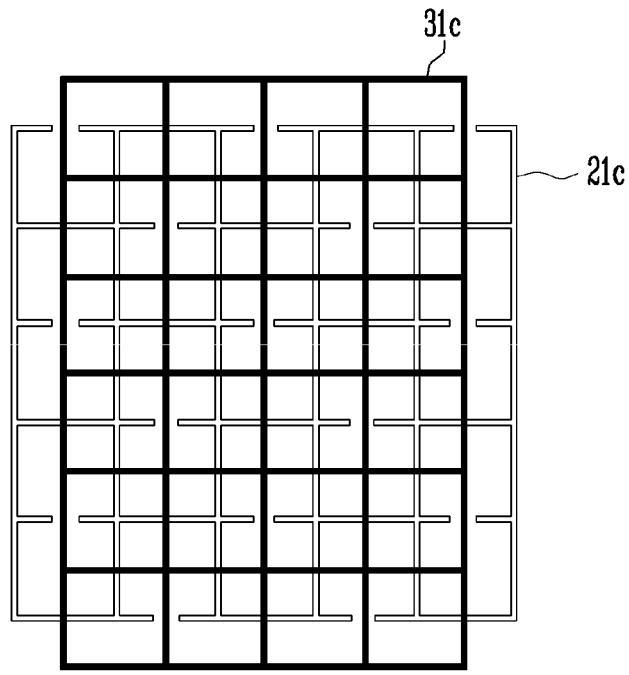

Referring to the embodiment of FIG. 3B, the conductive lines of second mesh patterns 31b may be disconnected, while the conductive lines of first mesh patterns 21b are connected. On the other hand, referring to the embodiment of FIG. 3C, the conductive lines of first mesh patterns 21c may be disconnected, while the conductive lines of second mesh patterns 31c are connected.

Figure 3D:
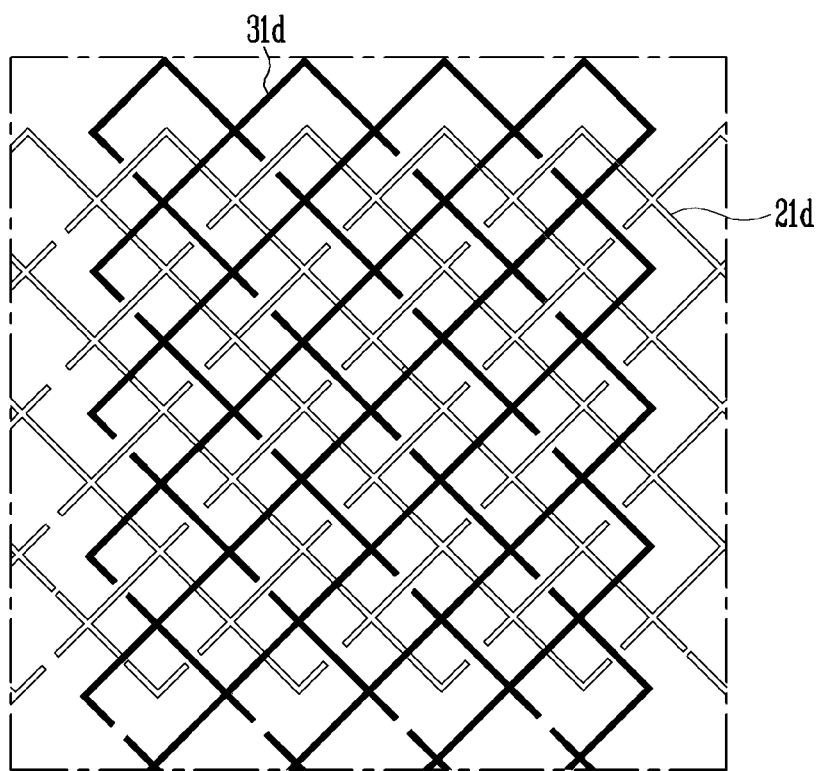
Figure 3E:
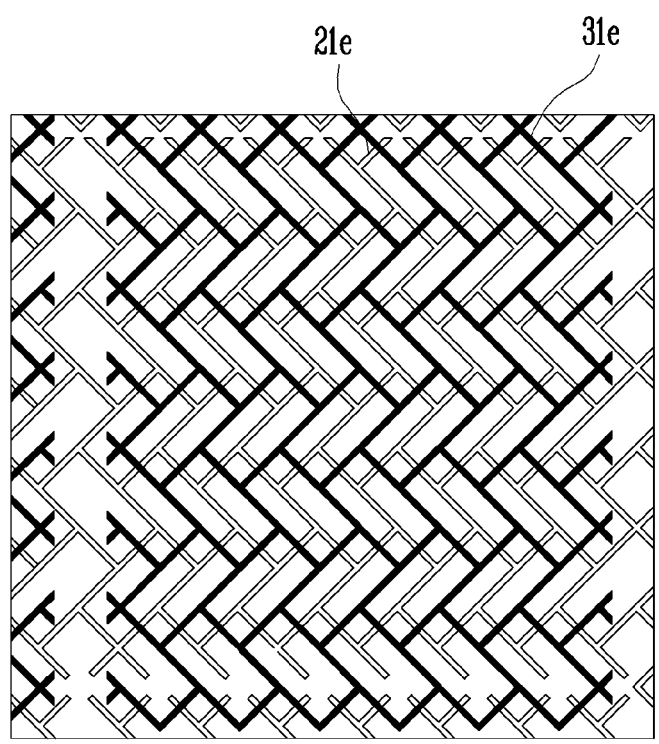

Referring to the embodiment of FIG. 3D, first and second mesh patterns 21d and 31d may have a rhombus shape in which their conductive lines extend diagonally relative to the first and second directions D1 and D2. Referring to the embodiment of FIG. 3E, rectangular latticed patterns are applied to first and second mesh patterns 21e and 31e in which there is no disconnected, protruding conductive line, and overlapping between conductive lines is avoided. The above-described mesh pattern structures in which a conductive line is disconnected to reduce overlapping points may be modified in various manners in addition to the embodiments described above. For example, the width, thickness, length, and the like, of a conductive line may be adjusted.

To summarize, in a touch screen panel having an overlapping mesh pattern structure, touch sensitivity may be decreased due to effects of overlapping capacitance. However, according to embodiments of the present system and method, overlapping capacitance that may cause reduction in touch sensitivity may be minimized by implementing a mesh pattern structure in which a portion of the mesh patterns is removed from a region where the first and second sensing electrodes would otherwise overlap each other, thereby preventing overlap in the region.

Example embodiments are disclosed herein. Those of ordinary skill in the art as of the filing of the present application would understand that features, characteristics, and/or elements described in connection with a particular embodiment may be used singly or in combination with features, characteristics, and/or elements described in connection with other embodiments unless otherwise specifically indicated. Those of ordinary skill in the art would also understand that various changes in form and details may be made without departing from the spirit and scope of the present system and method.

What is claimed is:

1. A touch screen panel, comprising:
    first sensing electrodes arranged in a first direction and in first mesh patterns; and
    second sensing electrodes arranged in a second direction crossing the first sensing electrodes in the first direction, the second sensing electrodes further arranged in second mesh patterns,
    wherein, at a region where the first and second sensing electrodes cross each other, a portion of at least one of the first and second mesh patterns is removed such that the first and second mesh patterns are free from overlap with each other at the location where the portion is removed.

2. The touch screen panel as claimed in claim 1,
    wherein the first and second mesh patterns have a structure in which a plurality of conductive lines cross each other,
    wherein at least one conductive line of the first and second mesh patterns is disconnected at a crossing region where a conductive line of the first mesh patterns and a conductive line of the second mesh patterns would otherwise cross if neither conductive line is disconnected.

3. The touch screen panel as claimed in claim 2,
    wherein the conductive line of the first mesh patterns and the conductive line of the second mesh patterns are alternately disconnected in adjacent crossing regions where at least one conductive line is disconnected.

4. The touch screen panel as claimed in claim 2,
    wherein the conductive line extends diagonally with respect to the first direction and the second direction.

5. The touch screen panel as claimed in claim 1, wherein the first and second sensing electrodes are formed of a same material and on different layers.

6. The touch screen panel as claimed in claim 1, further comprising an insulating layer disposed between the first sensing electrodes and the second sensing electrodes.

7. The touch screen panel as claimed in claim 1, wherein the first and second sensing electrodes are formed of at least one material selected from a group consisting of molybdenum (Mo), silver (Ag), titanium (Ti), copper (Cu) and aluminum (Al).

8. The touch screen panel as claimed in claim 1, further comprising a substrate, the substrate being divided into an active area and a non-active area bordering the active area,
    wherein the first and second sensing electrodes are provided in the active area of the substrate.

9. The touch screen panel as claimed in claim 8,
    wherein the first sensing electrodes are on a first surface of the substrate, and the second sensing electrodes are on a second surface facing oppositely from the first surface.

10. The touch screen panel as claimed in claim 8, wherein the substrate is a thin film substrate formed of at least one material selected from a group consisting of polyethylene terephthalate (PET), polycarbonate (PC), acryl, poly(methyl methacrylate) (PMMA), triacetyl cellulose (TAC), poly (ether sulfone) (PES), and polyimide (PI).

11. The touch screen panel as claimed in claim 1, further comprising external wires configured to couple each of the first and second sensing electrodes to an external driving circuit.

\* \* \* \* \*